(12) United States Patent
Herud

(10) Patent No.: US 9,676,037 B2
(45) Date of Patent: Jun. 13, 2017

(54) HYDRAULIC EXPANSION CHUCK AND METHOD FOR PRODUCING SUCH AN EXPANSION CHUCK

(71) Applicant: Kennametal Inc., Latrobe, PA (US)

(72) Inventor: Josef Konrad Herud, Herzogenaurach (DE)

(73) Assignee: KENNAMETAL INC., Latrobe, PA (US)

(*) Notice: Subject to any disclaimer, the term of this patent is extended or adjusted under 35 U.S.C. 154(b) by 498 days.

(21) Appl. No.: 14/080,853

(22) Filed: Nov. 15, 2013

(65) Prior Publication Data

US 2014/0145406 A1    May 29, 2014

(30) Foreign Application Priority Data

Nov. 27, 2012 (DE) .................. 10 2012 111 456

(51) Int. Cl.
*B23B 31/30* (2006.01)
*B23B 31/00* (2006.01)
(Continued)

(52) U.S. Cl.
CPC .......... *B23B 31/005* (2013.01); *B23B 31/028* (2013.01); *B23B 31/1074* (2013.01); *B23B 31/305* (2013.01); *B23B 2231/0264* (2013.01); *B23B 2231/46* (2013.01); *Y10T 29/494* (2015.01); *Y10T 279/1241* (2015.01); *Y10T 279/1283* (2015.01); *Y10T 279/17821* (2015.01); *Y10T 279/3487* (2015.01)

(58) Field of Classification Search
CPC .............. B23B 31/1074; B23B 31/305; B23B 2231/0264; B23B 2231/46; Y10T 279/1241; Y10T 279/1283; Y10T 279/17821; Y10T 279/3487
See application file for complete search history.

(56) References Cited

U.S. PATENT DOCUMENTS 3,994,615 A * 11/1976 Narang .................. B23B 31/005
                                                279/83
4,879,930 A * 11/1989 Von Haas ............... B23B 29/04
                                                279/143
(Continued)

FOREIGN PATENT DOCUMENTS

DE         2646951 A1 *  4/1978  ........... B23B 31/305
DE         3805527 A1 *  8/1989  ......... B23B 31/1074
(Continued)

*Primary Examiner* — Eric A Gates
(74) *Attorney, Agent, or Firm* — Ian K. Samways

(57) ABSTRACT

A hydraulic expansion chuck includes a basic body, an expansion bush which is received in the basic body and defines a reception space for a tool to be clamped, and a pressure chamber which is delimited between the expansion bush and the basic body. A securing pin is provided, which extends through the basic body and the expansion bush into the reception space. A method for producing a hydraulic expansion chuck is disclosed. First, a basic body is provided with a blind hole, into which an internal thread is cut. Then, an expansion bush is soldered into the basic body. Finally, an orifice is made at the bottom of the blind hole and extends through the material of the expansion bush into a tool reception space which is delimited in the expansion bush.

15 Claims, 4 Drawing Sheets

(51) Int. Cl.
  *B23B 31/107* (2006.01)
  *B23B 31/02* (2006.01)

(56) References Cited

U.S. PATENT DOCUMENTS

| | | | | |
|---|---|---|---|---|
| 5,468,102 | A * | 11/1995 | Stojanovski | B23B 31/008 |
| | | | | 279/83 |
| 6,640,679 | B1 * | 11/2003 | Roberts, Jr. | B23B 31/207 |
| | | | | 279/143 |
| 7,784,166 | B2 * | 8/2010 | Tanner | B23B 31/202 |
| | | | | 279/137 |
| 7,914,010 | B2 * | 3/2011 | Herud | B23B 31/028 |
| | | | | 279/156 |
| 8,827,610 | B2 * | 9/2014 | Hoffer | B23B 31/305 |
| | | | | 279/4.01 |
| 9,028,181 | B2 * | 5/2015 | Herud | B23B 31/028 |
| | | | | 279/156 |
| 2005/0044686 | A1 * | 3/2005 | Huijbers | B23B 31/305 |
| | | | | 29/428 |
| 2005/0184472 | A1 * | 8/2005 | Huijbers | B23B 31/305 |
| | | | | 279/4.01 |
| 2013/0001896 | A1 * | 1/2013 | Herud | B23B 31/005 |
| | | | | 279/4.07 |
| 2013/0115023 | A1 * | 5/2013 | Haimer | B23C 5/26 |
| | | | | 409/234 |
| 2013/0322980 | A1 * | 12/2013 | Nakai | B23B 31/005 |
| | | | | 409/234 |

FOREIGN PATENT DOCUMENTS

| | | | | |
|---|---|---|---|---|
| DE | 9002248 U1 | 6/1990 | | |
| DE | 3913626 A1 * | 10/1990 | | B23B 31/113 |
| DE | 94 11 260 U1 | 7/1994 | | |
| DE | 102006013662 A1 * | 9/2007 | | B23B 31/305 |
| DE | 10 2006 028 408 A1 | 10/2007 | | |
| DE | 102009053142 B3 | 6/2011 | | |
| DE | 20 2011 109 498 U1 | 4/2012 | | |
| DE | 102011106421 B3 * | 10/2012 | | B23B 31/005 |
| DE | 102013108105 A1 * | 1/2015 | | B23B 31/305 |
| FR | 1524356 A * | 5/1968 | | B23B 31/305 |
| GB | 912646 A * | 12/1962 | | B23B 31/305 |
| WO | WO 2009092365 A1 * | 7/2009 | | B23B 31/305 |

* cited by examiner

HYDRAULIC EXPANSION CHUCK AND METHOD FOR PRODUCING SUCH AN EXPANSION CHUCK

CLAIM TO PRIORITY

This application is a National entry application of German Application No. 102012111456.0, filed on Nov. 27, 2012, the entire contents of which is incorporated herein by reference.

FIELD OF THE INVENTION

The invention relates to a hydraulic expansion chuck with a basic body, with an expansion bush which is received in the basic body and defines a reception space for a tool to be clamped, and with a pressure chamber which is delimited between the expansion bush and the basic body. The invention relates, furthermore, to a method for producing a hydraulic expansion chuck.

BACKGROUND OF THE INVENTION

Hydraulic expansion chucks are generally known. A shank of a tool to be clamped can be inserted into the reception space. The pressure chamber is then put under pressure, with the result that the expansion bush is forced against the shank of the tool. The shank of the tool is then held frictionally in the reception space.

When the tool received in the expansion chuck is used for roughing machining tasks, high torques have to be transmitted between the expansion chuck and the tool. If the maximum holding moment of the expansion chuck is in this case overshot, relative movements occur between the tool and the expansion chuck. This may ultimately cause damage to the tool.

SUMMARY OF THE INVENTION

The object of the invention is to provide an expansion chuck, by means of which high torques can be transmitted reliably to the tool. The object of the invention is, furthermore, to provide a method for producing such an expansion chuck.

To achieve this object, according to the invention, in a hydraulic expansion chuck of the type initially mentioned, a securing pin is provided, which extends through the basic body and the expansion bush into the reception space. The securing pin can engage into a groove which is provided on the shank of the tool to be received. Thus, in addition to the frictional connection, a positive connection is achieved between the expansion bush and the tool shank, so that the tool cannot rotate in the reception space even under high loads. The expansion chuck according to the invention is in this case based on the recognition that the functioning of the expansion chuck can be maintained even though the securing pin extends through the expansion bush. It is also possible for the reception space to receive tools which have no groove which is to interact with the securing pin. Such a tool is pushed with its shank into the reception space until the end face of the shank bears against the securing pin. The shank is then clamped in the expansion chuck in the conventional way, to be precise solely by means of a frictional connection.

Preferably, a plurality of securing pins are provided, which are arranged so as to be spaced apart uniformly from one another in the circumferential direction. This causes force to be introduced uniformly along the circumference of the shank of the tool received in the reception space. In particular, three securing pins may be used, which are arranged at an angular interval of 120° in relation to one another.

Preferably, there is provision whereby the expansion bush has a solder portion, in the region of which it is soldered to the basic body, and whereby the securing pin extends through the solder portion. This refinement affords two advantages. On the one hand, the securing pin is arranged outside the pressure chamber which is delimited between the bush and basic body. This ensures that the use of the securing pin does not lead to any leaktightness problems. On the other hand, the securing pin, when located in the region of the solder portion, is arranged in proximity to the inner end of the reception space. A long clamping region therefore remains for those tools which are not provided on the shank with a groove into which the securing pin is to engage.

Preferably, there is provision whereby the securing pin has a threaded portion and a pin portion, the diameter of the pin portion being smaller than the diameter of the threaded portion. The pin portion, since it is threadless, can be received reliably in the orifice extending through the expansion bush and can fix the tool firmly against rotation.

According to the invention, a method for producing a hydraulic expansion chuck is also provided, in which, first, a basic body is provided with a blind hole, into which an internal thread is cut. An expansion bush is then soldered into the basic body. An orifice is subsequently made at the bottom of the blind hole and extends through the material of the expansion bush into a tool reception space which is delimited in the expansion bush. The basic concept of this method is that the receptacle for the securing pin is produced in two steps. In the first step, an orifice is provided which is given an internal thread. In the second step, an orifice is made which connects the portion provided with the internal thread to the reception space for the tool. In this case, the second part of the receptacle is produced after the expansion bush has been soldered to the basic body. Two advantages are thereby afforded: on the one hand, that region of the expansion bush through which the securing pin subsequently extends is closed during soldering, so that no solder material can flow out in an undesirable way. On the other hand, the material quantity which has to be removed after soldering in order to finish the receptacle for the securing pin is minimized. Since the expansion chuck is usually also hardened at the same time as the expansion bush is soldered in, drilling would otherwise have to be carried out in hardened material and, above all, an internal thread cut.

Preferably, the orifice is drilled through the expansion bush. This results in a low outlay in production terms.

According to an advantageous refinement of the invention, a butt plug is introduced into the reception space, and at least one securing pin is screwed into the internal thread in the basic body until the securing pin bears against the butt plug. The butt plug makes it possible to set the correct screw-in depth of the securing pin at low outlay.

Preferably, in this case, there is provision whereby the securing pin, when it is screwed in correctly, is secured by a screw securing means, in particular based on an adhesive. This ensures that the securing pin is not undesirably shifted out of place when the expansion chuck is used later.

BRIEF DESCRIPTION OF THE DRAWINGS

The invention is described below by means of an embodiment illustrated in the accompanying drawings in which.

DETAILED DESCRIPTION OF THE INVENTION

Figure 1:
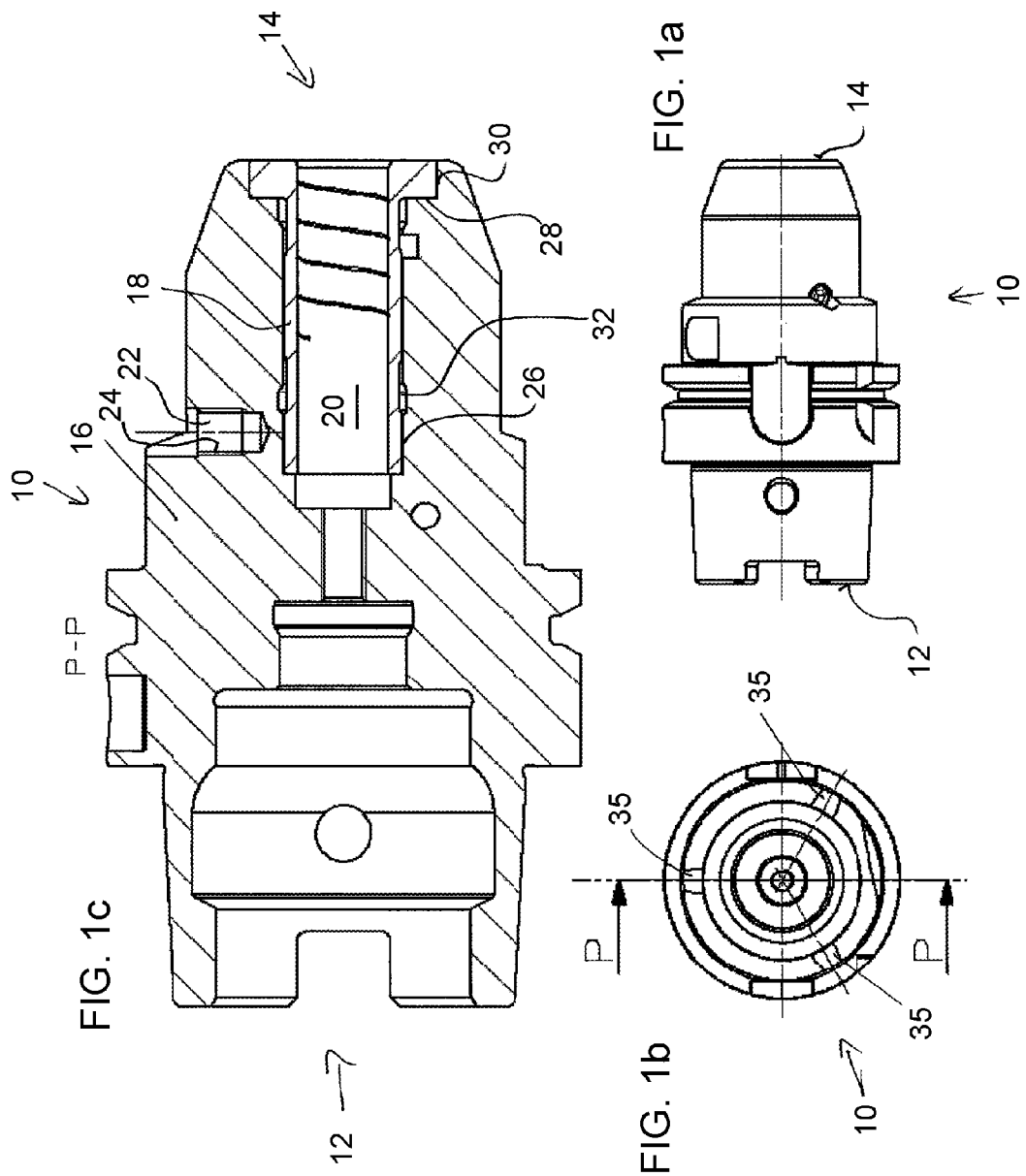
FIGS. 1a to 1c show a side view, a front view and a sectional view of an expansion chuck according to the invention in a first state of manufacture.

FIGS. 1a to 1c show an expansion chuck 10 which has a machine tool-side end 12 and a tool reception-side end 14. The expansion chuck 10 has a basic body 16, which is composed of metal, and an expansion bush 18, likewise composed of metal. Inside the expansion bush 18, a reception space 20 is formed, which issues on the tool reception-side end face of the expansion chuck 10.

The essential feature of the expansion chuck is that it is provided with a plurality of securing pins which are intended to interact with a tool received in the reception space 20, more precisely with grooves which are provided on the tool shank. These securing pins are received in receptacles which are provided in each case as a stepped bore in the basic body 16 and the expansion bush 18.

FIGS. 1a to 1c show the expansion chuck in a first intermediate state during production. This intermediate state is distinguished, in particular, in that a blind hole 22, which is given an internal thread 24, is provided for a securing pin in the basic body 16 for each receptacle to be produced later. The blind hole, on the one hand, is designed to have a depth such that the internal thread 24 has sufficient axial length. On the other hand, the blind hole 22 ends at a sufficient distance from the inner space, into which the expansion bush 18 is inserted, in the basic body 16.

The expansion bush 18 inserted into the basic body 16 can be seen clearly in FIG. 1c. The expansion bush 18 has at its two axial ends portions where it is to be soldered to the basic body 16. These are, at the inner end, a ring-shaped solder portion 26 and, at the outer end, a stepped solder portion which is composed of a radially oriented annular surface 28 and of an annular surface 30 adjoining the latter and running in the circumferential direction. Delimited between the solder portions 26 and 28, 30 is a pressure chamber 32 which can be supplied with a hydraulic fluid through ducts (not shown here).

The expansion bush 18 is soldered to the basic body 16 in the state shown in FIG. 1, that is to say in a state in which that portion in the basic body 16 which is assigned to the solder portion 26 of the expansion bush 18 is closed in the circumferential direction. This ensures that no solder material can escape in this region out of the gap around the solder portion 26.

When the expansion bush 18 is being soldered into the basic body 16, a temperature/time profile such that the expansion chuck overall is hardened is usually employed.

Figure 2:
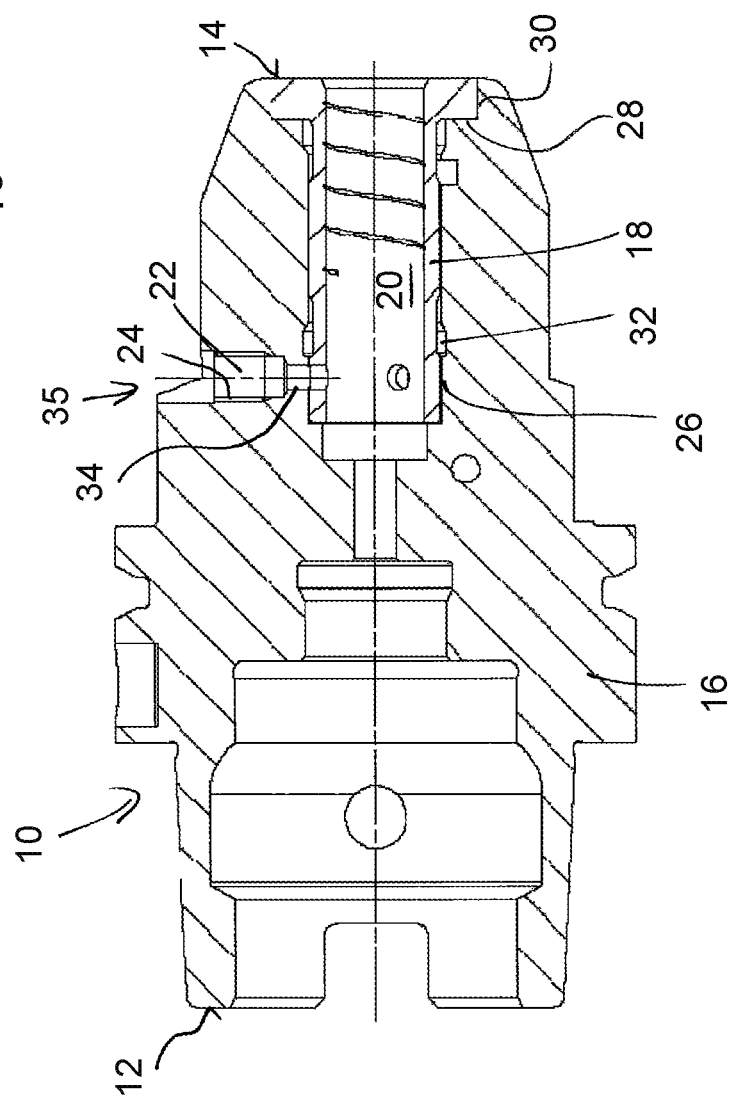
FIG. 2 shows a sectional view of the expansion chuck from FIG. 1 in a second state of manufacture.

FIG. 2 shows the expansion chuck in a state in which, after the soldering of the expansion bush 18 to the basic body 16, an orifice 34 has been formed at the bottom of the blind hole 22. The orifice 34 is made, in particular, as a bore and connects the space provided with the internal thread 24 to the reception space 20 inside the expansion bush. Thus, overall, the earlier blind hole 22 has given rise to a stepped bore, the portions 22, 34 of which together form a receptacle 35 for a securing pin. The orifice 34 is in this case formed concentrically with the internal thread 24 and passes through the expansion bush 18 in the solder portion 26. The orifice 34 is therefore surrounded on all sides by the solder material in the region of transition from the basic body 16 to the expansion bush 18 and is located at a distance from the pressure chamber 32. There are therefore no sealing problems.

Figure 3:
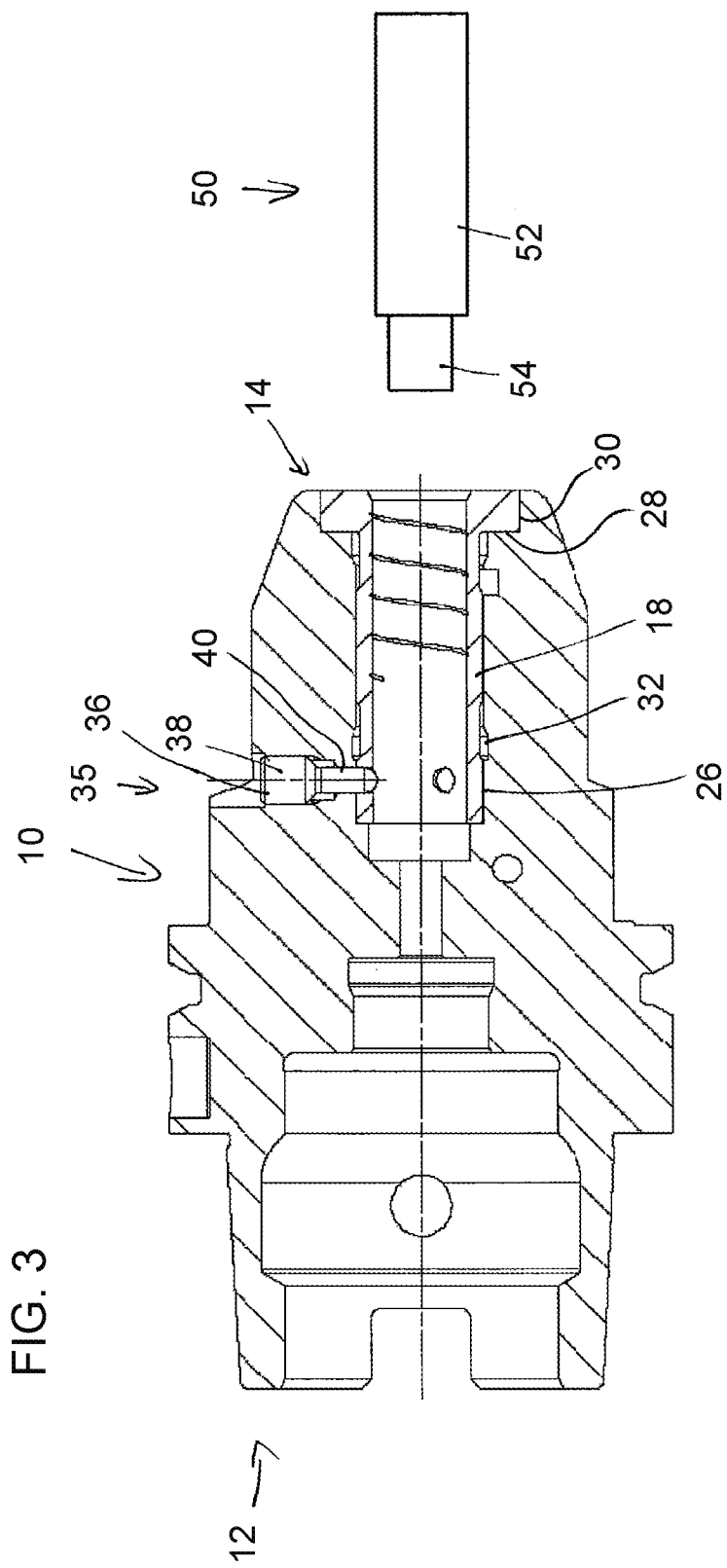
FIG. 3 shows a sectional view of the expansion chuck after manufacture is concluded.

FIG. 3 shows the expansion chuck 10 in a fully assembled state in which a securing pin 36 is screwed into the receptacle 35. The securing pin 36 is composed of a threaded portion 38 and of a pin portion 40. The threaded portion 38 is screwed into the internal thread 24 of the receptacle 35, and the pin portion 40 extends through the orifice 34 in the basic body 16 and through the expansion bush 18 in the region of the solder portion 26. In this case, the outside diameter of the pin portion 40 corresponds essentially to the inside diameter of the orifice 34, so that the securing pin 36 is guided, essentially free of play, in this region.

The pin portion 40 of the securing pin 36 extends into the reception space 20. In other words, the front inner end of the securing pin 36 projects inward beyond the inner wall of the expansion bush 18. In order to determine at low outlay the desired correct screw-in depth of all the securing pins 36, a butt plug 50 may be used, which has a guide portion 52 and a butt portion 54. The guide portion 52 serves for guiding the butt plug 50, free of play, inside the reception space 20. The butt portion 54 has a smaller diameter than the guide portion 52 and serves for limiting the screw-in depth of the securing pins 36. The securing pins 36 are screwed into the internal threads 24 until their front ends bear against the butt portion 54 of the butt plug 50. They can be secured in this position by a screw securing means, in particular by an adhesive.

Figure 4:
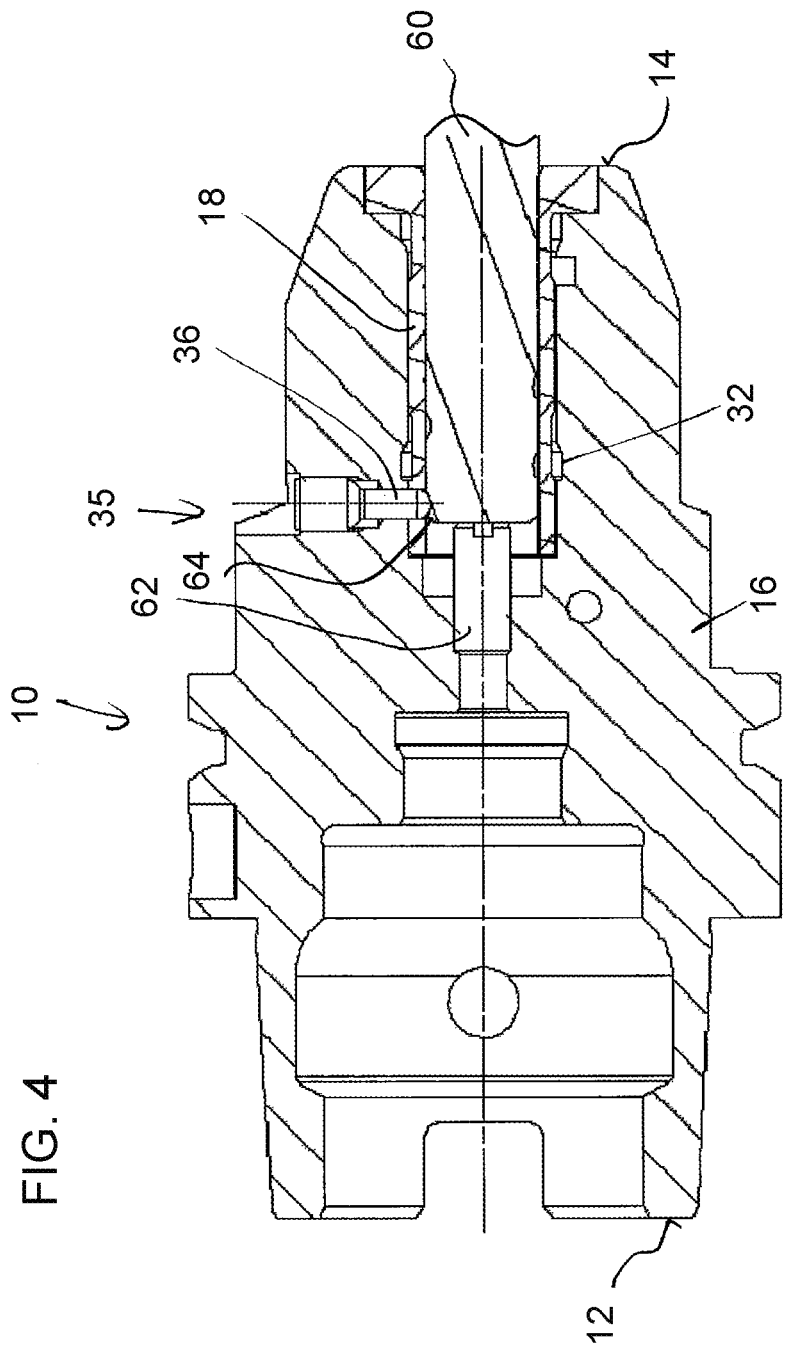
FIG. 4 shows the expansion chuck according to the invention with an inserted tool shank.

FIG. 4 shows a shank 60 of a tool, not illustrated in any more detail here, which is clamped in the reception space 20 of the expansion chuck. The insertion depth is determined by an adjustable buttress pin 62, and the securing pin 36 (or, more precisely, the overall three securing pins; see the three receptacles 35 in FIG. 1b) engage in each case into a groove 64 which is provided at the rear end of the shank 60. A positive connection effective in the circumferential direction is thereby implemented by the mechanical engagement of the securing pins 36 into the grooves 64.

What is claimed is:

1. A hydraulic expansion chuck, comprising:
   a basic body;
   an expansion bush disposed within the basic body, the expansion bush defining a reception space for a tool to be clamped;
   the expansion bush and basic body being secured with respect to one another at a connection region, to prevent relative axial movement of the expansion bush and basic body with respect to one another; and
   a pressure chamber disposed between the expansion bush and the basic body;
   wherein a securing pin extends through the basic body and the expansion bush through the connection region, and into the reception space to engage a shank of the tool to be clamped.

2. The expansion chuck as claimed in claim 1, wherein a plurality of securing pins are provided, which are arranged so as to be spaced apart from one another uniformly in the circumferential direction.

3. The expansion chuck as claimed in claim 1, wherein:
   the expansion bush and basic body are secured with respect to one another at the connection region, to prevent relative axial movement of the expansion bush and basic body with respect to one another, via soldering;

the expansion bush has a solder portion, which is soldered to the basic body at the connection region; and the securing pin extends through the solder portion.

4. The expansion chuck as claimed in claim 1, wherein the securing pin has a threaded portion and a pin portion, the diameter of the pin portion being smaller than the diameter of the threaded portion.

5. The expansion chuck as claimed in claim 1, wherein the securing pin is secured at the desired depth by an adhesive.

6. The expansion chuck as claimed in claim 1, wherein the securing pin bears against a butt portion of a butt plug which is employed temporarily in determining a screw-in depth of the securing pin.

7. The expansion chuck as claimed in claim 1, wherein:

the expansion bush and basic body are secured with respect to one another at the connection region, to prevent relative axial movement of the expansion bush and basic body with respect to one another, via soldering; and an inner end of the expansion bush includes a ring-shaped solder portion which is soldered to the basic body at a distance from the pressure chamber.

8. The expansion chuck as claimed in claim 7, wherein the securing pin is threaded into a receptacle comprising a stepped bore with an internal thread, and wherein the stepped bore is surrounded on all sides by the ring-shaped solder portion, thereby preventing leakage from the pressure chamber.

9. The expansion chuck as claimed in claim 1, wherein:

the expansion bush and basic body are secured with respect to one another at an additional connection region, to prevent relative axial movement of the expansion bush and basic body with respect to one another, via soldering; and an outer end of the expansion bush includes a stepped solder portion which is soldered to the basic body at the additional connection region.

10. The expansion chuck as claimed in claim 9, wherein the stepped solder portion comprises a radially-oriented annular surface and an axially-oriented annular surface adjoining the radially-oriented surface.

11. The expansion chuck as claimed in claim 9, wherein the pressure chamber is disposed between the ring-shaped solder portion and the stepped solder portion.

12. The expansion chuck as claimed in claim 1, wherein the securing pin extends through the basic body and into the reception space of the expansion bush until the securing pin bears against a butt plug, thereby determining a desired depth of the securing pin within the reception space.

13. The expansion chuck as claimed in claim 1, wherein the connection region is disposed away from the pressure chamber.

14. A hydraulic expansion chuck, comprising:

a basic body;

an expansion bush disposed within the basic body, the expansion bush defining a reception space for a tool to be clamped; and a pressure chamber disposed between the expansion bush and the basic body;

wherein a securing pin extends through the basic body and the expansion bush into the reception space to engage a shank of the tool to be clamped;

wherein an inner end of the expansion bush includes a ring-shaped solder portion which is soldered to the basic body at a distance from the pressure chamber; and wherein the securing pin is threaded into a receptacle comprising a stepped bore with an internal thread, and wherein the stepped bore is surrounded on all sides by the ring-shaped solder portion, thereby preventing leakage from the pressure chamber.

15. A hydraulic expansion chuck, comprising:

a basic body;

an expansion bush disposed within the basic body, the expansion bush defining a reception space for a tool to be clamped; and a pressure chamber disposed between the expansion bush and the basic body;

wherein a securing pin extends through the basic body and the expansion bush into the reception space to engage a shank of the tool to be clamped;

wherein an outer end of the expansion bush includes a stepped solder portion which is soldered to the basic body; and wherein the stepped solder portion comprises a radially-oriented annular surface and an axially-oriented annular surface adjoining the radially-oriented surface.

* * * * *